Patented Feb. 10, 1942

2,272,489

UNITED STATES PATENT OFFICE 2,272,489

NITROGENOUS CONDENSATION PRODUCTS AND A PROCESS OF PRODUCING SAME

Heinrich Ulrich, Ludwigshafen-on-the-Rhine, Germany, assignor, by mesne assignments, to General Aniline & Film Corporation, New York, N. Y., a corporation of Delaware No Drawing. Application August 1, 1936, Serial No. 93,767. In Germany August 7, 1935

6 Claims. (Cl. 260—239)

The present invention relates to new nitrogenous condensation products and a process of producing same.

I have found that very valuable nitrogenous products are obtained by causing alkylene-imines to react with organic compounds containing at least one group capable of reacting with basic compounds. The alkylene-imines may be employed in the monomeric or polymeric form. For example ethylene-imine, methylethylene-imine- (alpha, beta)-butylene-imine, omega-chlor-alpha, beta-butylene-imine, dodecylene-imine and their polymerization products of any desired degree of polymerization are suitable for the process. The said polymerization products may be produced, for example, in the manner described in United States Patent 2,182,306, issued December 5, 1939, to Heinrich Ulrich and Walter Harz.

The alkylene-imines may be caused to react for example with organic, for example aliphatic, hydroaromatic or heterocyclic compounds containing reactive or readily exchangeable halogen atoms. Thus for example especially valuable products are obtained by condensing polymeric 1.2-alkylene-imines with alkyl bromides, as for example ethyl bromide, ethylene chloride, hexyl chloride, decyl chloride, dodecyl chloride, octodecyl chloride, dichloroctodecane or mixtures of corresponding compounds such as may be obtained from mixtures of fatty acids occurring naturally. Very valuable products are also obtained by condensing polymeric alkylene imines with acid chlorides. Fatty acid halides, as for example the chlorides of stearic acid, oleic acid, the fatty acids present in palm kernel oil and coconut oil or the chlorides of hydroaromatic or heterocyclic carboxylic acids may be caused to react with alkylene-imines or their polymerization products. Free acids for example the acids mentioned above or maleic acid, or their anhydrides or esters may also be employed instead of the acid chlorides.

The alkylene-imines may also be caused to react with alkylene oxides or substances which are capable of reacting like alkylene oxides, as for example ethylene oxides, propylene oxide, butylene oxide, glycide and epichlorhydrin.

The alkylene-imines may also be condensed with carbonyl compounds, viz., aldehydes and/or ketones, or for example with formaldehyde, acetaldehyde or their polymerization products, with oleyl aldehyde or benzaldehyde or with acetone, methyl ethyl ketone and the like or mixtures of these substances.

The reaction conditions are adapted to the initial materials employed. The reaction usually takes place at temperatures between room temperature and 100° C., as for example at from 50° to 60° C., but higher or, in the case of especially reactive initial materials, lower temperatures may be advantageous. Equimolecular proportions of the initial materials may be allowed to react with each other or one of the components may be caused to react in excess. Depending on the nature and relative proportions of the initial materials, and in some cases on the reaction conditions, products which are soluble or insoluble in water can be obtained. The use of solvents or diluents, as for example water, alcohol, ether, cyclohexanone, toluene, carbon tetrachloride or chlorbenzene is frequently of advantage. The reaction may be carried out under increased pressure; especially when initial materials are employed which react only with difficulty it is preferable to carry out the condensation in a closed vessel under pressure. It may be advantageous to work in the presence of condensing agents; for example when condensing alkylene-imines with aldehydes or ketones the presence of phosphoric acid, phosphorus pentoxide, aluminium chloride, zinc chloride or boron fluoride is of advantage. When compounds containing exchangeable halogen are employed, it is frequently preferable to work in an alkaline medium.

The condensation, for example with aldehydes or ketones, may be carried out with an addition of other substances capable of condensation, as for example with an addition of urea or its substitution products, such as dimethylolurea and thiourea, or of phenols, or of amines, in particular amines of high molecular weight, such as cetylamine or oleylamine, or of acrylic or maleic acid and their derivatives, or of styrene. An addition of natural or synthetic rubber or of natural or synthetic resins is also frequently of advantage.

It may be of advantage to condense the alkylene-imines simultaneously with two or more of the said compounds or first with one of the said compounds, the reaction product being condensed with another reactive substance. For example reaction products of the imines with fatty acids, fatty acid chlorides, chlorocarbonic esters, sulphonic acid chlorides or chlorinated fatty acid chlorides may be first prepared and then brought into reaction with aldehydes, ketones or alkylene oxides. Water-soluble condensation products of alkylene-imines with alkylene oxides may be converted into urethanes or, by subsequent treatment with aldehydes, into insoluble products. Products which are still basic may be employed in the form of salts with mineral or organic acids, as for example with fatty acids.

The condensation products of alkylene-imines with organic compounds containing groups which are capable of reacting with basic compounds may be subsequently treated with any desired amounts of alkylene oxides or may be peralkylated or substituents, as for example carboxylic, sulphonic, sulphuric ester or phosphoric acid groups, may be introduced. The introduction of substituents may also be effected by employing, for the reaction with the alkylene-imines, compounds which already contain the desired substituents. Soluble condensation products derived from alkylene imines and alkylene oxides may be subjected to a treatment with substances which react with them with the introduction of groups which influence their solubility; for example they may be converted into insoluble products by treatment with aldehydes or ketones. The products may be alkylated. By condensation for example with chlorocarbonic acid esters, the condensation products may be converted into bodies similar to urethanes. On the other hand their solubility may be increased by the introduction of sulphonic, carboxylic or phosphoric acid groups. A further possibility in treatment consists in the introduction of acyl groups; either the finished condensation products or one or both of the initial components may be acylated. The acylation may be carried out by reaction with fatty acid chlorides, fatty acid esters, acid anhydrides or sulphonic acid chlorides, as for example toluene sulphochloride. Furthermore two or more of the said methods of treatment may be combined together or carried out consecutively.

The products obtainable according to this invention are colorless or slightly colored viscous liquid, or wax-like, or solid substances many of which are difficultly soluble or insoluble in water but soluble in organic solvents, the nature of the products obtained depending on the initial materials and working conditions employed.

The products are suitable for a great variety of purposes; for example they may serve alone or together with other suitable substances as assistants for the pharmaceutical, cosmetic, textile, leather, lacquer, rubber and like industries. For example they may be added with advantage to the spinning baths in the preparation of artificial silk; they increase the affinity of artificial silk to acid dyestuffs. The products may also be employed as additions in dyeing, printing, dressing, stripping, fulling, levelling, washing, dispersing and wetting or as softening or flotation agents. The products obtained when employing aldehydes or ketones may be used for example for impregnating and dressing textiles, leather, paper, straw and the like and for rendering textiles such as artificial silk crease-proof or slide-proof. Some of the products impart a water-repelling action to textiles treated therewith. They increase the fastness to water and washing of dyeings. The condensation products may also be employed in tanning. In many cases it is preferable to employ the products in a dissolved or dispersed form, for example while employing dispersing agents, as for example salts of the sulphuric esters of fatty alcohols or true sulphonic acids of aliphatic compounds of high molecular weight.

It may frequently be of advantage to produce the said condensation products directly on the material to be impregnated, for example by impregnating a fabric with a solution or dispersion of an alkylene-imine, if desired polymerizing the latter on the fibre and then treating the fabric for example in a solution of formaldehyde.

The following examples will further illustrate the nature of this invention but the invention is not restricted to these examples. The parts are by weight.

*Example 1*

43 parts of water-soluble polymerized ethylene-imine and 250 parts of the mixture of alkyl bromides corresponding to the fatty acids contained in palm kernel oil are heated at from about 50° to 60° C. for three hours while stirring. As soon as a sample withdrawn from the reaction mixture is soluble in water to give a clear solution, the reaction is interrupted.

Aqueous solutions of the reaction product thus obtained have an excellent washing action even in acid and neutral media. Similar products are obtained by employing the acid chlorides of the acids contained in palm kernel oil or the chlorocarbonic acid esters of the corresponding alcohols.

*Example 2*

88 parts of water-soluble polymerized methylethylene-imine

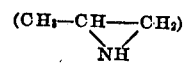

are condensed at about 60° C. with about 350 parts of stearic acid bromide. When working in the presence of aqueous alkali, the reaction takes place even at ordinary or slightly elevated temperature.

The product obtained may be employed as a softening agent for artificial silk or cotton.

*Example 3*

300 parts of stearic acid chloride or the equivalent amount of bromostearic acid chloride are condensed with 86 parts of water-soluble polymerized ethylene-imine. The reaction products are readily colloidally dispersable in water and may be employed as emulsifying agents.

Instead of stearic acid chloride stearic acid anhydride, chlorocarbonic esters or the dodecyl ether of glycolic acid chloride may be used.

Water-insoluble polymerized ethylene-imine may also be used instead of the water-soluble product.

*Example 4*

The product obtainable according to the first paragraph of Example 3 is brought into reaction with 144 parts of chlorethane sulphonic acid while heating. A sulphonic acid is obtained which dissolves in water giving a clear solution and which has a good stability to calcium salts and a good washing action. Chloracetic acid, chloracetic chloride, succinic acid, acrylic acid or the sodium salt of chlormethylbenzene sulphonic acid may be employed instead of chlorethane sulphonic acid.

*Example 5*

The product obtainable according to Example 2 is peralkylated by treatment with an excess of dimethyl sulphate. The reaction product may be advantageously employed as an addition in the stripping of dyeings of all kinds.

*Example 6*

88 parts of water-soluble or water-insoluble polymerized ethylene-imine are brought into reaction with about 300 parts of stearyl isocyanate while heating. The reaction product, probably a urea derivative, may serve as an assistant in the textile industry. The reaction may also be carried out on the fibre. The product may be subjected to further reactions with chlorethane sulphonic acid or chlorsulphonic acid.

Instead of polymerized ethylene-imine, its reaction product with beta.beta'-dichlor-diethyl ether may be used for the reaction with stearyl isocyanate.

Example 7

1 molecular proportion of the reaction product of ethelene-imine with the equimolecular amount of the mixture of alkyl bromides which correspond to the alcohols obtainable by reduction of the fatty acids of palm kernel oil is caused to react with 1 or 10 or more molecular proportions of ethylene oxide. Products are obtained which are valuable as assistants in the textile industry, for example as additions in dyeing in acid baths, or as agents for the animalization of artificial silk. Polymerized ethylene-imine may be employed instead of the monomeric ethylene-imine. The said mixture of alkyl bromides may also be replaced by the mixture of the chlorides of the fatty acids contained in palm kernel oil or by benzyl chloride or toluene sulphonic acid chloride.

Example 8

20 parts of monomeric ethylene-imine are dissolved in 100 parts of water. 100 parts of ethylene oxide are led in. The reaction mixture is dehydrated in vacuo. It is an oily liquid which is eminently suitable for the treatment of textiles.

Example 9

35 parts of monomeric propylethylene-imine are diluted with 20 parts of water and caused to react at elevated temperature, as for example 50° C., with the equimolecular proportion of epichlorhydrin. The reaction product is dehydrated in vacuo. It may be employed for example as a preservative against moths.

Example 10

20 parts of polymerized ethylene-imine are mixed with 20 parts of water. While stirring at 30° C., 20 parts of ethylene oxide are led in and the resulting product is dehydrated in vacuo. A highly viscous liquid is obtained which is suitable for stripping dyeings of all kinds.

Epichlorhydrin, glycide, propylene oxide or the like may also be employed instead of ethylene oxide. Alcohol, cyclohexane, toluene or other organic liquids may be used as diluents instead of water.

Example 11

50 parts of 30 per cent formaldehyde are added to 43 parts of ethylene-imine and the mixture is then heated for two hours at 60° C. An oily condensation product still soluble in water is obtained which may be employed for example for the production of crease-proof effects.

Example 12

From 100 to 200 parts of formaldehyde (30 per cent strength) are added to 43 parts of polymerized ethylene-imine and the mixture is then heated for two hours at 60° C. A valuable condensation product is obtained, which is insoluble in water but soluble in organic solvents. Reaction products having different properties are obtained depending on the amount of formaldehyde and the temperature or duration of the reaction employed. Products insoluble in organic solvents may also be produced.

Example 13

Cotton or artificial silk is treated at for example 20° or 60° C. with a solution of polymerized ethylene-imine in carbon tetrachloride in an amount of 10 per cent with reference to the weight of the cotton. The goods are then subjected to a treatment with 30 per cent formaldehyde. By this treatment they are animalized to a great extent (i. e. they become considerably more absorptive for acid wool dyestuffs) and moreover may be wetted very rapidly.

By adding other compounds capable of condensation, as for example acetic anhydride or amines of high molecular weight, such as oleylamine, a specially soft touch or a high resistance to creasing may be imparted to the fabric.

Example 14

400 parts of liquid water-soluble polymerized ethylene-imine are mixed while stirring with 40 parts of a chlorinated paraffin wax containing about 3 chlorine atoms per molecule. The temperature rises up to from 110° to 120° C. As soon as the reaction is completed a practically colorless product is obtained which is very suitable for the after-treatment of dyeings.

By reacting the product with benzyl chloride or dimethyl-sulphate in order to convert it into a compound of the type of quaternary ammonium compounds or by treating it with ethylene oxide water-soluble products may be obtained which are very suitable for incorporation with artificial silk spinning masses or for the after-treatment for artificial silk.

Example 15

400 parts of polymeric C-butylethylene-imine (or N-butyl-ethylene-imine) are reacted at 30° C. with 40 parts of dinitrochlorbenzene. During the reaction the temperature is raised to about 100° C. The reaction product as well as the diamino compound obtainable therefrom by reduction may be employed with advantage in the production of artificial silk. The products may be incorporated with artificial silk spinning masses or the ready-made artificial silk may be after-treated therewith.

Example 16

400 parts of polymeric C-butylethylene-imine $$(CH_3-CH_2-CH_2-CH_2-CH-CH_2)$$
$$\diagdown_{NH}\diagup$$

are reacted with 166 parts of chloroethane sulphonic acid sodium salt. The condensation product obtained is a valuable assistant for the textile industry; it may for example be employed as an addition in mercerizing baths.

By treating the compound with stearic acid chloride, oleic acid chloride, octodecyl bromide, octodecenyl chloride, butyl chloride, hexyl chloride and the like, further valuable assistants for the textile industry are obtained which may be used for example as softening agents, washing agents and as additions in the stripping of dyeing.

Example 17

220 parts of polymeric N-propylethylene imine (or C-propylethylene-imine) are reacted with 110 parts of monoglycerine chlorhydrin. A highly viscous reaction product is obtained which may be employed as a levelling agent.

By introducing into the molecule of the compound obtained a high molecular aliphatic radicle (for example by reacting it with dodecyl bromide or alkyl bromide mixtures corresponding to naturally occurring fatty acid mixtures) products are obtained which are very suitable for producing a water-repelling action.

Instead of polymeric propylethylene imine polymeric N-phenylethylene imine may be employed, whereby a product is obtained which may also be used as an assistant in the textile and related industries.

Example 18

200 parts of polymeric ethylene imine are reacted with 171 parts of nitrobenzylchloride at between 40° and 120° C. The product obtained may be alkylated by treatment with dimethyl sulphate or reacted with chloroethane sulphonic acid or sulphonating agents, valuable assistants for the textile industry thus being obtained.

Toluene sulphonic acid chloride or benzoyl chloride may be employed instead of nitrobenzyl chloride.

Example 19

200 parts of phthaloyl chloride are condensed with 440 parts of polymeric C-hexyl ethylene-imine by warming. The product is suitable for rendering textiles slide-proof.

Example 20

440 parts of solid or liquid polymerized ethylene imine are reacted with 200 parts of chloroacetic acid. The compound obtained may be employed for example for the absorption of acid gases. Chloroacetyl chloride, dichloroacetic acid, bromoacetic acid, bromostearic acid and the like may be employed instead of chloro-acetic acid.

By treatment with alkyl halides alkyl groups may be introduced into the molecule of the compounds thus obtainable.

Example 21

116 parts of maleic acid are condensed with polymeric ethylene imine. A valuable artificial mass is formed by the reaction which is accompanied by the evolution of heat.

Example 22

350 parts of polymeric butyl ethylene-imine are heated in a closed vessel with 88 parts of ethylene oxide (or 116 parts of propylene oxide or 148 parts of glycide) at 130° to 160° C. If a constant pressure is obtained the reaction is finished. The reaction product may be used with advantage as an addition for spinning masses in the production of artificial silk.

Polymeric hexyl or dodecylethylene imine may be employed instead of polymeric butyl ethylene-imine.

The reaction may be carried out in the presence of water. In this case the reaction product is dried in vacuo.

Example 23

120 parts of N-phenylethylene-imine are reacted with 880 parts of ethylene oxide, the latter being added slowly while gradually raising the temperature to about 50° C. A water-soluble product is obtained which may be employed as a levelling agent and which possesses a disinfecting action.

N-phenylethylene imine may be replaced by N-cyclohexyl or N-benzyl ethylene imine.

Valuable products are also obtained by condensation of ethylene-imine with ethylene oxide and subsequent treatment with cyclohexyl chloride or benzyl bromide.

Example 24

71 parts of butylene-imine

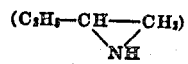

are warmed with 44 parts of ethylene oxide or 58 parts of propylene oxide in a closed vessel at 60° to 70° C. The reaction product may be added with advantage to spinning baths for the production of artificial silk.

Example 25

99 parts of isohexylene-imine or 183 parts of dodecylene-imine are warmed with 44 parts of ethylene oxide in a closed vessel at from 60° to 70° C. A reaction product is obtained which may be added with advantage to spinning baths for the production of artificial silk.

Example 26

43 parts of ethylene-imine are cautiously warmed with 70 parts of croton aldehyde on the water bath. A faintly colored condensation product is obtained.

Instead of monomeric ethylene-imine polymeric ethylene-imines of different degree of polymerization and instead of croton aldehyde mixtures of the same with other aldehydes may be employed and the proportions may be varied considerably.

Example 27

200 parts of water-soluble polymerized ethylene-imine are condensed with 268 parts of oleic aldehyde. The yellow colored condensation product may be used for different purposes in the textile industry. It may also be produced on the fibre.

Example 28

100 parts of monomeric butyl ethylene-imine are warmed on the water bath with 88 parts of acetaldehyde or the corresponding amount of benzaldehyde in alcoholic solution while stirring. A valuable artificial mass is obtained.

If some parts of phosphoric acid, phosphorus pentoxide, aluminium chloride or zinc chloride are added or a slow current of boron fluoride is led in, the reaction proceeds especially smoothly and satisfactorily.

Example 29

100 parts of propylethylene-imine are condensed with 166 parts of aldol while stirring. The reaction proceeds especially smoothly if butanol is added as a diluent.

Example 30

The product obtainable by condensing 400 parts of water-soluble polymeric ethylene imine with 300 parts of palm kernel fatty chloride or dichlorstearyl chloride is condensed with formaldehyde, an insoluble product suitable for the production of lacquers and varnishes being obtained. The product may also be incorporated with spinning masses for the production of artificial silk or applied in emulsified form, to ready-made artificial silk. The product may also be produced in the spinning mass or on the ready artificial silk. In dependence on the fatty component employed a water-repelling and/or softening effect is obtained.

Instead of employing the said condensation product the products obtained by condensation of polymeric ethylene-imine and the corresponding amounts of coco fatty acid chloride or free coco fatty acid or the chlorocarbonic acid octodecyl ester may be used.

*Example 31*

58 parts of acetone are stirred with 43 parts of ethylene-imine whereby the temperature rises to about 40° to 50° C. A water-soluble condensation product is obtained which may be converted into insoluble products by condensation with aldehydes. Valuable condensation products are also obtained if cyclohexanone is employed instead of acetone.

*Example 32*

440 parts of polymeric ethylene-imine are warmed with 106 parts of benzaldehyde while stirring vigorously. By a vivid reaction a condensation product is formed which is only difficultly swellable in water. Instead of benzaldehyde the equimolecular amount of benzophenone and instead of polymeric ethylene-imine the monomeric compound may be employed.

*Example 33*

18 parts of an about 30 per cent aqueous solution of a condensation product derived from 44 parts of polyethylene-imine and 8.8 parts of ethylene oxide are mixed while stirring with 7 parts of chlorocarbonic acid butyl or octyl ester. With vigorous reaction, there is formed a urethane-like compound which has an excellent emulsifying power and which may also be used as a softening agent for artificial compositions.

*Example 34*

An about 60 per cent solution of the condensation product derived from 88 parts of polyethylene-imine and 40 parts of ethylene oxide is caused to react with oleic acid chloride. A vigorous reaction takes place as the result of which soluble, or emulsifiable, or glassy solid masses are obtained depending on the amount of oleic acid chloride used.

By aftertreating the said products with formaldehyde, water-insoluble products are obtained.

*Example 35*

53 parts of the reaction product derived from 44 parts of polyethylene-imine and 8.8 parts of ethylene oxide are mixed with 37 parts of chloracetic acid. By stirring the mixture, condensation with the evolution of heat takes place, a glass-like solid mass thus being formed. The solution of the product in caustic soda solution has a good wetting and foaming power.

*Example 36*

53 parts of the reaction product of 44 parts of polyethylene-imine and 8.8 parts of ethylene oxide are caused to react with 100 parts of the sodium salt of benzyl chloride sulphonic acid. A water-soluble substance of good foaming and wetting power is obtained.

*Example 37*

480 parts of a product obtainable from 440 parts of polymerized ethylene-imine and 44 parts of ethylene oxide are slowly mixed on the waterbath while stirring with 283 parts of the chlorocarbonic acid ester of commercial lauryl alcohol. A reaction product is obtained which imparts a pleasant soft touch to artificial silk and considerably improves its absorption of dye.

*Example 38*

300 parts of stearic acid chloride are caused to act while stirring on the waterbath or at from 150° to 160° C. with the product obtained by the condensation of 176 parts of ethylene oxide with 440 parts of polymerized ethylene-imine. A product is obtained which may be used as softening agents and as a cleansing agent.

Stearic acid chloride may also first be caused to act on the said condensation product, and then acetyl chloride or butyric acid chloride, whereby similar products are obtained.

*Example 39*

336 parts of a condensation product prepared from ethylene oxide and C-propyl-ethylene-imine are mixed with 300 parts of oleic acid chloride while stirring and heating. The reaction product is a good softening agent for artificial compositions. It increases the dye-absorption of artificial fibres to a considerable extent.

*Example 40*

The product obtained according to Example 1 or a urethane-like product prepared therefrom is heated with the equivalent amount or a multiple of the equivalent amount of chloracetic acid or chloracetic acid ester. The resulting products may be used for various kinds of textile improvement.

*Example 41*

A product prepared according to Example 1 or a product obtained therefrom by reaction with chlorocarbonic acid esters or acylating agents, as for example oleic acid chloride, is treated with chlorsulphonic acid or phosphorus oxychloride, whereby a readily water-soluble product is obtained which may be used as an addition for baths for the treatment of textiles.

*Example 42*

A textile fabric is treated with a solution of the product prepared according to Example 1 (or of a urethane or acylation product derived therefrom) in a suitable solvent and then kept in motion in a bath containing 20 grams of formaldehyde per liter. After drying, the fabric has an excellent fastness to creasing and a soft touch.

*Example 43*

Formaldehyde is allowed to act in excess on the product obtainable according to Example 1. An artificial resin is obtained which is capable of various uses.

Instead of the said initial material, its reaction products with acylating agents or sulphonating agents may be used.

What I claim is:

1. Nitrogenous condensation products from a non-crystalline product obtained by polymerization of an ethylene imine and an aliphatic halide containing at least 16 carbon atoms in the hydrocarbon chain.

2. Nitrogenous condensation products from a non-crystalline product obtained by polymerization of an ethylene imine and a mixture of aliphatic halides corresponding to the fatty acids contained in palm-kernel oil.

3. Nitrogenous condensation products from a non-crystalline product obtained by polymerization of an ethylene imine and a halogenated paraffin wax.

4. The process of producing nitrogenous products which comprises condensing a non-crystalline product obtained by polymerization of an ethylene imine with an aliphatic halide containing at least 16 carbon atoms in the hydrocarbon chain.

5. The process of producing nitrogenous products which comprises condensing a non-crystalline product obtained by polymerization of an ethylene imine with a mixture of aliphatic halides corresponding to the fatty acids contained in palm-kernel oil.

6. The process of producing nitrogenous products which comprises condensing a non-crystalline product obtained by polymerization of an ethylene imine with a halogenated paraffin wax.

HEINRICH ULRICH.